(12) United States Patent
Mancuso et al.

(10) Patent No.: US 6,256,414 B1
(45) Date of Patent: *Jul. 3, 2001

(54) DIGITAL PHOTOGRAPHY APPARATUS WITH AN IMAGE-PROCESSING UNIT

(75) Inventors: Massimo Mancuso, Monza; Viviana D'Alto; Rinaldo Poluzzi, both of Milan; Fabrizio Airoldi, Feriolo, all of (IT)

(73) Assignee: SGS-Thomson Microelectronics S.r.l., Agrate Brianza (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,443

(22) Filed: Apr. 28, 1998

(30) Foreign Application Priority Data

May 9, 1997 (EP) .................................... 97830215

(51) Int. Cl.[7] ...................................... G06K 9/36
(52) U.S. Cl. ............................................ 382/232
(58) Field of Search ................... 382/100, 232, 382/254, 255, 274, 312, 313, 325; 348/207, 208, 222, 231, 232, 233, 714, 715, 716, 717, 718, 719, 720, 721

(56) References Cited

U.S. PATENT DOCUMENTS 4,887,161 * 12/1989 Watanabe et al. ................. 358/224

| | | | |
|---|---|---|---|
| 5,018,017 | * | 5/1991 | Sasaki et al. .......................... 358/209 |
| 5,111,299 | * | 5/1992 | Aoki et al. ............................ 358/209 |
| 5,187,747 | * | 2/1993 | Capello et al. ....................... 382/124 |
| 5,231,501 | * | 7/1993 | Sakai ..................................... 358/209 |
| 5,341,489 | * | 8/1994 | Heiberger et al. .................... 395/425 |
| 5,563,655 | * | 10/1996 | Lathrop ................................. 348/231 |
| 5,818,975 | * | 10/1998 | Goodwin et al. ..................... 382/274 |
| 5,828,793 | * | 10/1998 | Mann ..................................... 382/284 |

FOREIGN PATENT DOCUMENTS

| | | | |
|---|---|---|---|
| 0 669 752 A2 | 2/1995 | (EP) | ................. H04N/1/40 |
| 0 675 648 A2 | 3/1995 | (EP) | ................. H04N/5/926 |
| 95/16323 | 6/1995 | (WO) | ................. H04N/1/21 |

OTHER PUBLICATIONS

Robert Forchheimer, et al., "Single–Chip Image Sensors With a Digital Processor Array," Journal of VLSI Signal Processing, vol. 5, Nos. 2/3, Apr. 1993, pp. 121–131.

\* cited by examiner

Primary Examiner—Jose L. Couso
(74) Attorney, Agent, or Firm—Theodore E. Galanthay; Allen, Dyer, Doppelt, Milbrath & Gilchrist, P.A.

(57) ABSTRACT

A digital photography apparatus, particularly a digital still camera, includes circuit portions for acquiring a digital image, and for obtaining a compressed image. The apparatus also includes a memory for storing the compressed image. A processor is provided for obtaining a processed image and corresponding processing parameters from the image acquired. The processor supplies as an output, in a first operative condition, the processed image to be compressed by the compression circuit portion. In a second operative condition, the processor supplies as an output the image acquired to be compressed by the compression portion and the processing parameters to be stored in the memory.

35 Claims, 2 Drawing Sheets

DIGITAL PHOTOGRAPHY APPARATUS WITH AN IMAGE-PROCESSING UNIT

FIELD OF THE INVENTION

The present invention relates to digital photography and, more particularly, to a digital photography apparatus for acquiring a digital image representative of an actual scene.

BACKGROUND OF THE INVENTION

In a typical digital photography apparatus, and particularly in a digital still camera (or DSC), an image of an actual scene is represented by a matrix of digital values (a digital image). The digital image can be transferred to a computer, sent to a network, or displayed on a television screen, without the need for photographic printing on a physical media and subsequent digitization. Digital images transferred to the computer can be processed with the use of suitable programs and printed directly by a user. This eliminates the cost of films and developing, thereby reducing the time required to produce the photographs.

Digital images are typically subjected to a compression process to increase the number of images which can be stored simultaneously in an internal memory of the camera. In cameras which use a proprietary compression algorithm such as, for example, that developed by Kodak, the digital images which typically are acquired partially by a light sensor, are compressed immediately and then saved in the internal memory so as to optimize the compression process. A disadvantage of this approach is that it always requires a computer to decompress and possibly process the digital images and to exchange the digital images with users using other devices.

In a different known structure which uses a standard compression algorithm, such as the JPEG algorithm, the partial data acquired by the light sensor are interpolated to produce an actual digital image. The digital images are then compressed and saved in the internal memory. The compressed images can be sent directly to other users or transferred to a computer to be decompressed and displayed by most available image-processing devices. However, this approach also requires a computer to be able to decompress and process the digital images and to be able to send them to other devices.

SUMMARY OF THE INVENTION

In view of the foregoing background, it is therefore an object of the present invention to avoid the aforesaid drawbacks, such as requiring a separate external computer. This and other objects, features and advantages in accordance with the present invention are provided by a digital photography apparatus comprising: means for acquiring a digital image representative of an actual scene; compression means for forming a compressed digital image; and a memory for storing the compressed digital image. Moreover, the apparatus also preferable includes processing means for obtaining a processed digital image and corresponding processing parameters from the acquired digital image and for supplying as an output, in a first operative condition, the processed digital image to be compressed by the compression means and, in a second operative condition, the acquired digital image to be compressed by the compression means and the processing parameters to be stored in the memory.

The apparatus of the present invention processes the digital images directly internally and does not therefore require an external computer. This apparatus has an architecture which is not dependent on the technique used for compressing the digital images and is suitable for the use of any proprietary or standard algorithm.

BRIEF DESCRIPTION OF THE DRAWINGS

Further characteristics and advantages of the digital photography apparatus according to the present invention will become clearer from the following description of preferred embodiments thereof, given by way of non-limiting example, with reference to the appended drawings, in which.

DETAILED DESCRIPTION OF THE PREFERRED EMBODIMENTS

Figure 1:
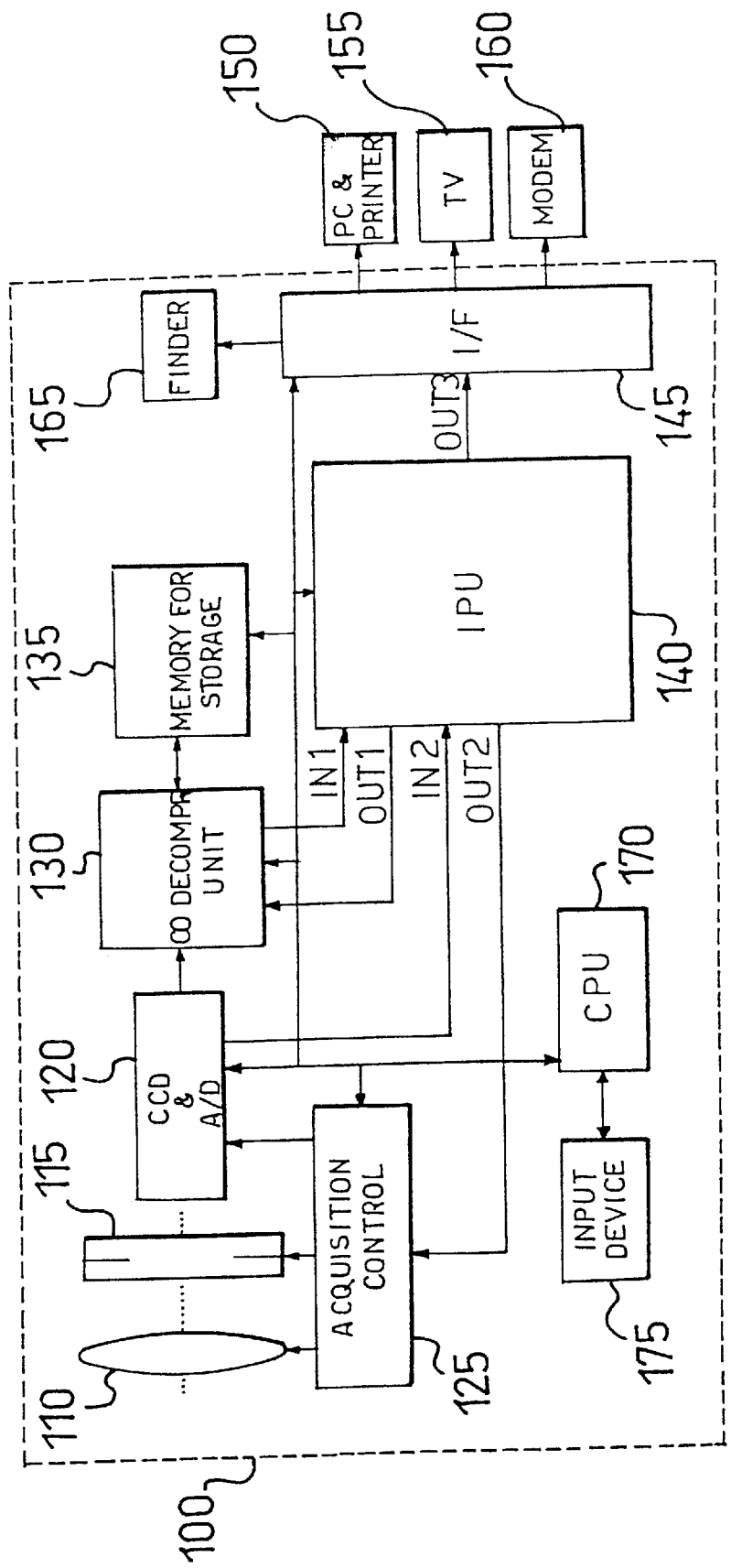
FIG. 1 is a basic block diagram of digital photography apparatus according to the present invention.

With reference, in particular, to FIG. 1, there is shown a digital photography apparatus 100 provided, in particular, by a digital still camera. However, the present invention is also suitable for use in different applications such as, for example, in a digital video camera, a portable scanner, and the like.

The digital camera 100 includes a digital-image acquisition unit comprising a set of lenses 110 and a diaphragm 115 for supplying an image of an actual scene to a light sensor 120. When a photograph is taken, the diaphragm 115 is opened and the light corresponding to the image to be acquired is focused by the lenses 110 onto the light sensor 120 for a certain period of time. The light sensor 120 typically includes a charge-coupled device (or CCD). A CCD is an integrated circuit which contains a matrix of light-sensitive cells each of which generates an electrical signal (for example, a voltage) the intensity of which is proportional to the exposure of the light-sensitive cell. The electrical signal generated by each light-sensitive cell is transformed, by means of a suitable analog/digital converter (A/D), into a digital value representative of an elemental area of the image (a pixel).

To have a color image, the light is broken down into various components typically corresponding to the colors red, blue and green (or RGB). Corresponding to each elemental area of the image there are three cells which are sensitive, respectively, to the wavelengths of red, blue and green light so as to obtain values indicative of the relative RGB components for each pixel. Generally, to reduce the number of light-sensitive cells, the light sensor 120 does not detect all of the RGB components in each pixel. For example, in half of the pixels only the G components are detected and in the other half, only the R and B components are detected. The digital image thus acquired has blurring which is eliminated (as described below) by interpolation of the partial data detected by the light sensor 120, A unit 125 controls the digital image acquisition process, sending suitable control signals to the lenses 110, to the diaphragm 115, and to the light sensor 120.

The camera 100 includes a compression/decompression unit 130 which can produce a compressed digital image (for example, by reducing the quantity of associated data by a factor of several tens) and can subsequently decompress the compressed image. In the camera 100 according to the present invention, the compression/decompression unit 130 may use either a proprietary compression algorithm such as that developed by Kodak, or a standard compression algorithm such as the JPEG algorithm. The compression/ decompression unit 130 is connected to a memory 135 to store the digital images in compressed form. Typically, the memory 135 is provided by a dynamic memory which has a capacity of a few Mbytes and can store several tens of compressed digital images. alternatively, the memory is a flash EPROM which also stores the data in the absence of a supply, and additional external memory cards with capacities of a few tens of Mbytes may also be used.

An image-processing unit, (or IPU) 140 is provided in the camera 100 according to the present invention and has a first input (IN1) and a second input (IN2) connected, respectively, to the compression/ decompression unit 130 and to the light sensor 120. A first output (OUT1) and a second output (OUT2) are connected, respectively, to the compression/decompression unit 130 and to the acquisition-control unit 125. The light sensor 120 is also connected directly to the compression/decompression unit 130 so that the IPU 140 can be excluded (by-passed). The IPU 140 preferably has a third output (OUT3) connected to an interface unit 145 for connection to external devices such as, for example, a personal computer (PC) 150, a television set 155, or a modulator-demodulator (MODEM) 160 for connection to a network, such as the INTERNET.

The interface 145 is also connected to a finder 165 preferably formed by a liquid crystal device (or LCD). The finder 165 acts as a view-finder when photographs are being taken, to reproduce the image which is being acquired The finder 165 preferably also enables the photographs to be previewed. In this case, a user can select the best images, immediately canceling those not required. It should be noted that, in a preferred embodiment of the present invention, the compression/decompression unit 130 and the IPU 140 (and possibly also the interface 145) are produced in integrated form on a single chip of semiconductor material.

A central processing unit (or CPU) 170 controls the different operations of the various components of the digital camera 100 by means of suitable pulses. The CPU 170 is connected to an input device 175 provided, for example, by a set of push-buttons, to enable the user to select the various functions of the digital camera 100.

Figure 2:
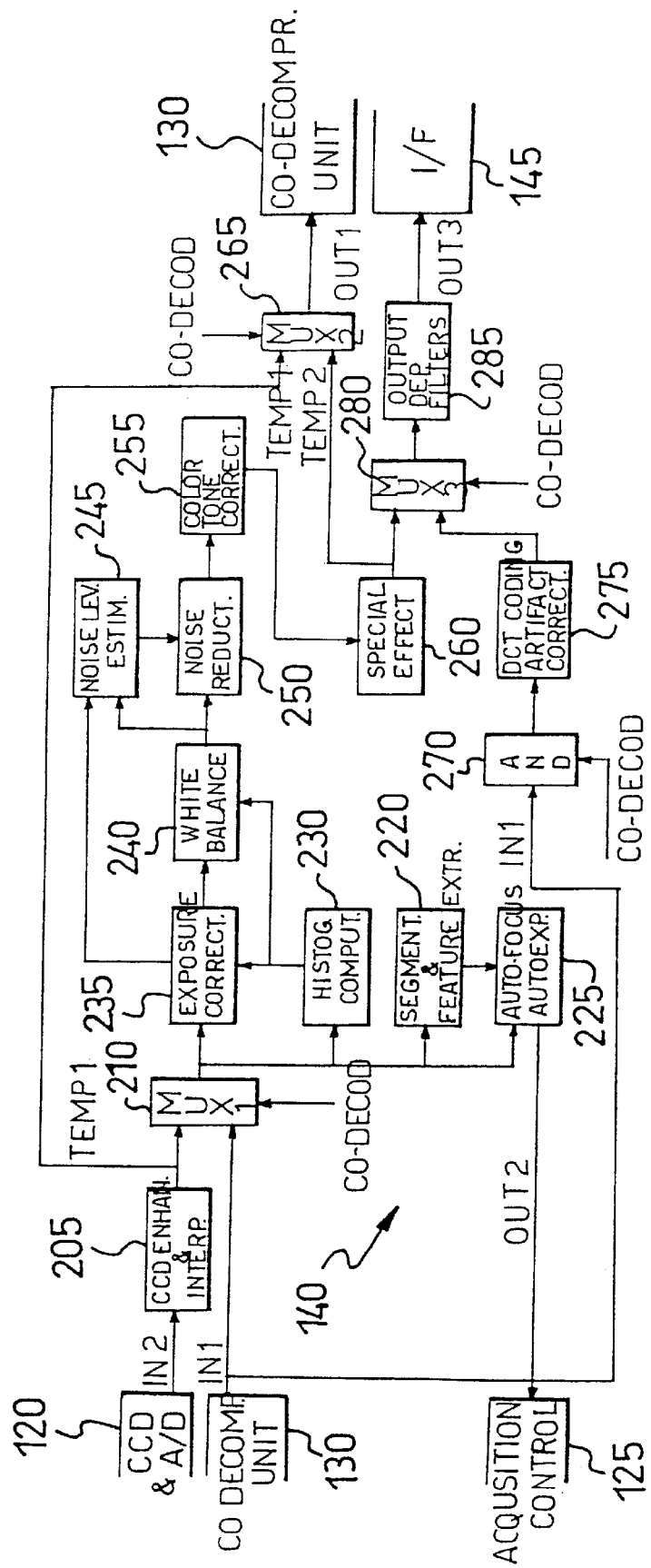
FIG. 2 shows the structure of the image-processing unit of FIG. 1, in detail.

With reference now to FIG. 2, (the elements already shown in FIG. 1 are identified by the same reference numerals or symbols), the input IN2 is connected to a unit 205 for enhancing the output of the light sensor 120. The unit 205 typically modifies, by means of an interpolation process, the digital image acquired, to thereby deduce the missing RGB components to eliminate blurring. The number of pixels is also increased to thereby improve resolution as will be readily appreciated by those skilled in the art.

An output TEMP1 of the interpolation unit 205 is connected to a first input of a multiplexer circuit 210, the second input of which is connected directly to the input IN1 of the IPU 140. The multiplexer 210 transfers one of the two inputs to an output of the multiplexer 210, in accordance with an appropriate control signal CO-DECOD applied to a selection input of the multiplexer. The output of the multiplexer 210 is connected to a segmentation unit 220 which divides the digital image into several regions. For each region, the segmentation unit 220 deduces various parameters such as high-frequency content, average luminosity, and the like. A unit 225 for automatically determining focus (autofocus) and exposure (autoexposure) is connected to the output of the multiplexer 210 and to an output of the segmentation unit 220.

The values determined by the segmentation unit 220 are weighted appropriately on the basis of the characteristics of the image so as to determine the optimal focus and exposure parameters. "Fuzzy" logic techniques as described, for example, in Shimizu et al., "A New Algorithm for Exposure Control Based on Fuzzy Logic for Video Camera", IEEE Transactions on Consumer Electronics, Vol. 38, No. 3, p. 617–623, August 1992 and in Haruki et al., "Video Camera System Using Fuzzy Logic", IEEE Transactions on Consumer Electronics, Vol. 38, No. 3, p. 624–634, August 1992 are preferably used for this purpose. An output of the autofocus and autoexposure unit 225 is connected to the output OUT2 of the IPU 140 so as to supply these parameters to the acquisition-control unit 125.

A signal output by the multiplexer 210 is also applied to a calculation unit 230 which produces a histogram of the frequency distribution of the image. An automatic exposure-correction unit 235 is connected to the output of the multiplexer 210 and to an output of the calculating unit 230. The digital image is modified on the basis of the data of the histogram produced by the calculation unit 230 so as to correct exposure problems such as, for example, back-lighting or excessive front lighting.

A white-balancing unit 240 is connected to an output of the exposure-correction unit 235 and to the output of the calculation unit 230. The digital image is further modified so as to correct the color shift of the light towards red (reddish) or towards blue (bluish), dependent on the color temperature of the light source. As in the case described above, "fuzzy" logic techniques are also preferably used in these units. It should be noted, however, that the present invention can also be implemented with different or further units for controlling the digital-image acquisition process.

The IPU 140 also contains a noise-level estimation unit 245 connected to the output of the exposure-correction unit 235 and to an output of the white-balancing unit 240. The unit 245 produces an estimate of the noise dependent on the luminosity of the digital image. A noise-reduction unit 250 is connected to the output of the white-balancing unit 240 and to an output of the estimation unit 245. The digital image is modified on the basis of the estimation performed by the unit 245 so as to reduce dynamically the effects of the noise introduced by the light sensor, dependent on the noise level and on the spatial characteristics of the image. This is described, for example, in Nakajima et al., "A new Noise Reduction System for Video Camera", IEEE Transactions on Consumer Electronics, Vol. 37, No. 3, p. 213–219, August 1991 and in G. De Haan et al., "Memory Integrated Noise Reduction IC for Television", IEEE Transactions on Consumer Electronics, Vol. 42, No. 2, p. 175–181, May 1996. It should be noted that, in this case, the correction carried out will be dependent on the magnitude of the exposure correction effected by the unit 235 since the noise introduced by the light sensor depends on the luminosity of the image.

The unit 250 is connected in cascade with a color-tone correction unit 255. The unit 255 corrects alterations (dependent on the type of illumination) of one or more color categories without altering the other colors of the image. In particular, this improves the quality of representation of the skin color tone in a portrait, or of the sky and of the grass in a landscape as described, for example, in E. J. Lee et al., "Color Enhancement of TV Picture Using RGB Sensor", IEEE Transactions on Consumer Electronics, Vol. 42, No. 2, p. 182–191, May 1996. Various special effects such as, for example, a mist effect, a "fume" effect and the like are applied to the digital image by a unit 260 connected to an output of the color-tone correction unit 255. It should be noted, however, that the present invention can also be implemented with different or further units for improving the quality of the digital image.

The digital image thus processed by the units 230–260 is supplied at an output TEMP2 of the special effects unit 260. The output TEMP2 of the unit 260 and the output TEMP1 of the interpolation unit 205 are connected, respectively, to a first and a second input of a multiplexer circuit 265 which transfers one of the two inputs to an output of the multiplexer circuit 265, which is connected to the output OUT1 of the IPU 140. This is done in accordance with the control signal CO-DECOD applied to a selection input of the multiplexer.

The signal at the input IN1 of the IPU 140 and the control signal CO-DECOD are also applied to an AND logic unit 270. An output of the AND logic unit 270 is connected to a unit 275 for correcting alterations (such as a mosaic effect) introduced by the discrete cosine transform (or DCT) encoding method used in the JPEG compression algorithm. It should be noted that the AND unit 270 is advantageously used to prevent any malfunctioning of the unit 275 due to a non-coherent input signal. An example of the construction of the unit 275 is described in T.Jarske et al., "Post-Filtering Methods for Reducing Blocking Effects from Coded Images", IEEE Transactions on Consumer Electronics, Vol. 40, No. 3, p. 521–526, August 1994.

The IPU 140 includes a further multiplexer circuit 280 having a first and a second input connected, respectively, to the output TEMP2 of the special effects unit 260 and to an output of the unit 275. The multiplexer 280 also has a selection input to which the control signal CO-DECOD is applied. An output of the multiplexer 280 is connected to a filtering unit 285, the output of which is connected directly to the output OUT3 of the IPU 140. The unit 285 filters the processed digital image according to the external device selected. For example, if the external device is a PC which, typically, is connected to a printer for reproducing the photographs, the filtering unit 285 increases the resolution of the digital image by means of an interpolation process.

This process is advantageously also used to apply further processing to the digital image such as, for example, a digital zoom, a change in the ratio of its dimensions (for example, from 4:3 to 16:9) and the like. Alternatively, if the external device is the television set, the digital image is filtered to compensate for the loss of sharpness in the images with highly saturated colors due to a y-correction function which is typically applied to the digital image. The unit 285 is also used for filtering the digital image to be sent to the finder (165 in FIG. 1), for example, by the application of a control of the dynamic range of the image. A control unit (not shown in the drawing) controls the various functions of the IPU 140 and communication with the CPU (170 in FIG. 1).

To describe the operation of the camera, it is assumed that a photograph is being taken. If the compression/decompression unit 130 uses a standard algorithm (JPEG), the control signal CO-DECOD adopts a first value (for example, 00). In this situation, the multiplexer 210 transmits as an output the signal which is applied to the output TEMP1 and which is provided by the digital image acquired by the light sensor 120 and suitably interpolated by the unit 205. This digital image is processed by the units 225–260 according to the functions selected by the user by means of the input unit (175 in FIG. 1). The digital image thus processed is supplied to the output TEMP2 and is transferred to the output OUT1 by the multiplexer 265. The processed digital image is then compressed by the unit 130 and stored in the memory (135 in FIG. 1) of the camera.

If the compression/decompression unit 130 uses a proprietary algorithm (KODAK), the control signal CO-DECOD adopts a second value (for example, 01). In this situation, the signal applied to the output TEMP1 is processed in the same manner as in the previous case. The multiplexer 265 transfers to the output OUT1 the signal at the output TEMP1, provided by the digital image acquired by the light sensor 120 and interpolated by the unit 205. This image is compressed and stored. Processing parameters calculated by the IPU 140 during the previous processing stage are also supplied to the compression/decompression unit 130 and are stored in a suitable structure associated with the compressed digital image. In particular, these parameters are stored in a separate file or in an initial portion of a file containing the compressed digital image, as provided for, for example, in the "FlashPix" format.

In both of the above-described operative conditions of the IPU 140, the processed digital image applied to the output TEMP2 is advantageously transferred by the multiplexer 280 (by means of the unit 285) to the output OUT3 and then by the interface unit 145 to the finder (165 in FIG. 1). It should be noted that if a proprietary algorithm is used, the architecture of the present invention allows the processed digital image corresponding to the final product to be supplied to the user also in this situation.

In a preferred embodiment of the present invention, the IPU 140 can adopt two further operative conditions to transfer the decompressed digital images to an external device. If a standard compression algorithm is used, the control signal CO-DECOD adopts a third value (for example, 10). In this situation, the signal which is applied to the input IN1 and which is provided by the processed digital image read from the memory (135 in FIG. 1) and decompressed by the unit 130), is transferred to the correction unit 275 by the AND unit 270. The processed digital image is manipulated by the unit 275 and is applied to an input of the multiplexer 280 which transfers it to its output and then to the output OUT3 of the IPU 140 by means of the filtering unit 285. Finally, the signal at the output OUT3 is transferred to the interface unit 145 to reach the external device selected.

If a proprietary compression algorithm is used, the control signal CO-DECOD adopts a fourth value (for example, 11). In this situation, the multiplexer 210 transmits as an output the signal which is applied to the input IN1 and which is constituted by the digital image acquired (read from the memory (135 in FIG. 1) and decompressed by the unit 130), together with the corresponding processing parameters previously stored. The digital image is processed by the units 230–260 in accordance with these parameters. The digital image thus processed is supplied to the output TEMP2. The multiplexer 280 transfers this signal to its output and then, as in the previous case, to the external device selected. It should be noted that, in this embodiment of the present invention, the camera can be connected directly to any device such as, for example, a printer, without the need for an external computer.

Naturally, to satisfy contingent and specific requirements, one of skill in the art may apply to the above-described digital photography apparatus many modifications and variations, all of which, however, are included within the scope of protection of the invention as defined by the following claims.

That which is claimed is:

1. A digital photography apparatus comprising:
an acquisition circuit for acquiring a digital image representative of an actual scene;
a compression circuit for forming a compressed digital image;
a memory for storing the compressed digital image; and
a processor for obtaining a processed digital image and corresponding processing parameters from the acquired digital image and for supplying as an output, in a first operative condition corresponding to a first compression algorithm, the processed digital image to be compressed by the compression circuit and, in a second operative condition corresponding to a second compression algorithm, the acquired digital image to be compressed by the compression circuit and the processing parameters to be stored in the memory with the processing parameters corresponding to the processed digital image obtained from the acquired digital image.

2. An apparatus according to claim 1, further comprising a decompression circuit for decompressing the compressed digital image; and wherein the processor, in a third operative condition, receives the processed digital image obtained by said compression circuit from the compressed digital image read out from said memory to supply the processed digital image to an external device and, in a fourth operative condition, receives the acquired digital image, obtained by said compression circuit from the compressed digital image read out from said memory, and the processing parameters corresponding to the Processed digital image obtained from the acquired digital image to obtain the processed digital image and to supply the processed digital image to the external device.

3. An apparatus according to claim 1, further comprising a finder for displaying the processed digital image.

4. An apparatus according to claim 1, wherein the processor comprises a first unit for producing a histogram of a frequency distribution of the acquired digital image, and a second unit for correcting exposure of the digital image acquired in accordance with the histogram.

5. An apparatus according to claim 4, wherein the processor comprises a third unit for balancing whiteness of the acquired digital image in accordance with the histogram.

6. An apparatus according to claim 1, wherein the processor comprises a fourth unit for estimating a noise level of the acquired digital image, and a fifth unit for reducing noise of the digital image acquired in accordance with the estimated noise level.

7. An apparatus according to claim 1, wherein the processor comprises a sixth unit for correcting at least one color tone of the acquired digital image.

8. An apparatus according to claim 1, wherein the processor comprises:
a seventh unit for segmenting the acquired digital image into a plurality of regions, and for calculating quantities associated with each of the regions; and
an eighth unit for automatically determining a focus and exposure of the apparatus in accordance with the quantities.

9. An apparatus according to claim 1, wherein the processor comprises a ninth unit for correcting alterations in the processed digital image obtained from the compressed digital image.

10. An apparatus according to claim 3, wherein the processor comprises a tenth unit for filtering the processed digital image to be supplied to the finder, and for filtering the processed digital image to be supplied to the external device dependent on the external device.

11. An apparatus according to claim 1, wherein the acquisition circuit comprises an eleventh unit for correcting blurring, and for increasing resolution of the acquired digital image.

12. An apparatus according to claim 2, wherein the compression circuit, the decompression circuit and the processing circuit are formed on a single chip of semiconductor material.

13. An apparatus according to claim 1, wherein the apparatus is a digital still camera.

14. A digital photography apparatus comprising:
a compression circuit for forming a compressed digital image;
a memory for storing the compressed digital image; and
a processor for obtaining a processed digital image and corresponding processing parameters from an acquired digital image and for supplying as an output, in a first operative condition corresponding to a first compression algorithm, the processed digital image to be compressed by the compression circuit and, in a second operative condition corresponding to a second compression algorithm, the acquired digital image to be compressed by the compression circuit and the processing parameters to be stored in the memory with the processing parameters corresponding to the processed digital image obtained from the acquired digital image.

15. An apparatus according to claim 14, further comprising a decompression circuit for decompressing the compressed digital image; and wherein the processor, in a third operative condition, receives the processed digital image obtained by said compression circuit from the compressed digital image read out from said memory to supply the processed digital image to an external device and, in a fourth operative condition, receives the acquired digital image, obtained by said compression circuit from the compressed digital image read out from said memory, and the processing parameters corresponding to the processed digital image obtained from the acquired digital image to obtain the processed digital image and to supply the processed digital image to the external device.

16. An apparatus according to claim 14, further comprising a finder for displaying the processed digital image.

17. An apparatus according to claim 14, wherein the processor comprises a first unit for producing a histogram of a frequency distribution of the acquired digital image, and a second unit for correcting exposure of the digital image acquired in accordance with the histogram.

18. An apparatus according to claim 17, wherein the processor comprises a third unit for balancing whiteness of the acquired digital image in accordance with the histogram.

19. An apparatus according to claim 14, wherein the processor comprises a fourth unit for estimating a noise level of the acquired digital image, and a fifth unit for reducing noise of the digital image acquired in accordance with the estimated noise level.

20. An apparatus according to claim 14, wherein the processor comprises a sixth unit for correcting at least one color tone of the acquired digital image.

21. An apparatus according to claim 14, wherein the processor comprises:
a seventh unit for segmenting the acquired digital image into a plurality of regions, and for calculating quantities associated with each of the regions; and
an eighth unit for automatically determining a focus and exposure of the apparatus in accordance with the quantities.

22. An apparatus according to claim 14, wherein the processor comprises a ninth unit for correcting alterations in the processed digital image obtained from the compressed digital image.

23. An apparatus according to claim 16, wherein the processor comprises a tenth unit for filtering the processed digital image to be supplied to the finder, and for filtering the processed digital image to be supplied to the external device dependent on the external device.

24. An apparatus according to claim 15, wherein the compression circuit, the decompression circuit and the processing circuit are formed on a single chip of semiconductor material.

25. An apparatus according to claim 14, wherein the apparatus is a digital still camera.

26. A digital photography method to be used with a digital photography device of a type including a compression circuit for forming a compressed digital image, a memory for storing the compressed digital image and a processor for processing an acquired digital image, the method comprising the steps of:

obtaining a processed digital image and corresponding processing parameters from an acquired digital image and supplying as an output, in a first operative condition corresponding to a first compression algorithm, the processed digital image to be compressed by the compression circuit and, in a second operative condition corresponding to a second compression algorithm, the acquired digital image to be compressed by the compression circuit and the processing parameters corresponding to the processed digital image, obtained from the acquired digital image, to be stored in the memory.

27. A digital photography method according to claim 26, wherein the digital photography device further comprises a decompression circuit for decompressing the compressed digital image; and wherein the step of obtaining further comprises in a third operative condition, receiving the processed digital image obtained from the compressed digital image to supply the processed digital image to an external device and, in a fourth operative condition, receiving the acquired digital image, obtained from the compressed digital image, and the corresponding processing parameters, to obtain the processed digital image and to supply the processed digital image to the external device.

28. A digital photography method according to claim 26, further comprising the steps of producing a histogram of a frequency distribution of the acquired digital image, and correcting exposure of the digital image acquired in accordance with the histogram.

29. A digital photography method according to claim 28, further comprising the step of balancing whiteness of the acquired digital image in accordance with the histogram.

30. A digital photography method according to claim 26, further comprising the steps of estimating a noise level of the acquired digital image, and reducing noise of the digital image acquired in accordance with the estimated noise level.

31. A digital photography method according to claim 26, further comprising the step of correcting at least one color tone of the acquired digital image.

32. A digital photography method according to claim 26, further comprising the steps of:

segmenting the acquired digital image into a plurality of regions, and for calculating quantities associated with each of the regions; and automatically determining a focus and exposure of the apparatus in accordance with the quantities.

33. A digital photography method according to claim 26, further comprising the step of correcting alterations in the processed digital image obtained from the compressed digital image.

34. A digital photography method according to claim 26, further comprising the steps of filtering the processed digital image to be supplied to a finder, and filtering the processed digital image to be supplied to an external device dependent on the external device.

35. A digital photography method according to claim 26, further comprising the steps of correcting blurring, and increasing resolution of the digital acquired image.

* * * * *

UNITED STATES PATENT AND TRADEMARK OFFICE
CERTIFICATE OF CORRECTION

PATENT NO.  : 6,256,414 B1
DATED       : July 3, 2001
INVENTOR(S) : Massimo Mancuso, Viviana D'Alto, Rinaldo Poluzzi, Fabrizio Airoldi It is certified that error appears in the above-identified patent and that said Letters Patent is hereby corrected as shown below:

<u>Title page,</u>
Item [75], delete "Milan" insert -- Milano --

<u>Column 3,</u>
Line 6, delete "images. alternatively," insert -- images. Alternatively, --
Line 28, delete "acquired The" insert -- acquired. The --

<u>Column 7,</u>
Line 31, delete "the Processed digital image" insert -- the processed digital image --

Signed and Sealed this

Twenty-sixth Day of February, 2002

*Attest:*

*Attesting Officer*

JAMES E. ROGAN
*Director of the United States Patent and Trademark Office*